United States Patent
Parkin

(10) Patent No.: US 7,140,628 B2
(45) Date of Patent: Nov. 28, 2006

(54) LIVING HINGE MEMBER AND SUSPENSION

(75) Inventor: Michael James Parkin, Ridgefield, CT (US)

(73) Assignee: Cannondale Corporation, Bethel, CT (US)

( * ) Notice: Subject to any disclaimer, the term of this patent is extended or adjusted under 35 U.S.C. 154(b) by 0 days.

(21) Appl. No.: 11/035,942

(22) Filed: Jan. 14, 2005

(65) Prior Publication Data

US 2005/0151344 A1 Jul. 14, 2005

Related U.S. Application Data

(63) Continuation of application No. 10/258,675, filed on Oct. 25, 2002.

(51) Int. Cl.
*B62K 3/00* (2006.01)
*B62K 3/14* (2006.01)

(52) U.S. Cl. .................. 280/281.1; 280/284; 280/285; 280/288; 280/283; 280/275

(58) Field of Classification Search ............. 280/281.1, 280/284, 285, 288, 283, 275
See application file for complete search history.

(56) References Cited

U.S. PATENT DOCUMENTS

| | | | | |
|---|---|---|---|---|
| 618,627 A * | 1/1899 | Travis | ........................ | 280/284 |
| 2,178,939 A * | 11/1939 | Pease | ........................ | 280/283 |
| 2,283,671 A * | 5/1942 | Finlay et al. | ................ | 280/284 |
| 4,900,048 A | 2/1990 | Derujinsky | ............... | 280/281.1 |
| 5,080,385 A | 1/1992 | Duplessis | ................ | 280/281.1 |
| 5,098,114 A * | 3/1992 | Jones | ........................ | 280/284 |
| 5,411,280 A | 5/1995 | Allsop et al. | ............ | 280/281.1 |
| 5,544,907 A | 8/1996 | Lin et al. | ................. | 280/288.3 |
| 5,557,982 A | 9/1996 | Voss et al. | ................. | 74/551.1 |
| 5,613,794 A | 3/1997 | Isaac et al. | .................. | 403/265 |
| 5,826,899 A * | 10/1998 | Klein et al. | ................. | 280/284 |
| 5,842,711 A | 12/1998 | Legerot | ................... | 280/281.1 |
| 5,853,651 A | 12/1998 | Lindsay et al. | ............. | 264/512 |
| 5,857,690 A | 1/1999 | Gueugneaud | ............ | 280/281.1 |
| 5,865,456 A * | 2/1999 | Busby et al. | ................ | 280/284 |
| 5,947,499 A | 9/1999 | Busby | ........................ | 280/284 |
| 6,056,307 A | 5/2000 | Busby et al. | ................ | 280/284 |
| 6,076,845 A * | 6/2000 | Lawwill et al. | ............. | 280/284 |
| 6,270,104 B1 | 8/2001 | Nelson et al. | ........... | 280/281.1 |
| 6,386,567 B1 * | 5/2002 | Schonfeld | .................... | 280/283 |
| 6,406,048 B1 * | 6/2002 | Castellano | .................... | 280/284 |

(Continued)

*Primary Examiner*—Lesley D. Morris
*Assistant Examiner*—Marlon Arce-Diaz
(74) *Attorney, Agent, or Firm*—St. Onge Steward Johnston & Reens LLC

(57) ABSTRACT

A structural member (38, 40) is designed to have a first portion having a first composite layup, a second portion having a second composite layup, and at least one center portion having at least a third composite layup such that it can flex near a desired point of the structural member. The structural member may be used as a chain stay (26) in a bicycle frame (10). The chain stays are designed to have a geometry that will allow for flexing or bending at or in the vicinity of a desired point. They may be pre-loaded for flex in both a positive and negative direction. The chain stays are designed having a varying cross sectional area. The bending or flexing location of the chain stays has a narrower height from the side view than the ends of the chain stay allowing the chain stay to flex. Additionally, the bending or flexing location has a wider width from the top view than the ends of the chain stay for additional torsional and lateral stiffness.

38 Claims, 16 Drawing Sheets

U.S. PATENT DOCUMENTS 6,783,142 B1 * 8/2004 Schober ...................... 280/284

2002/0038944 A1 * 4/2002 Lawwill et al. ............. 280/284

* cited by examiner

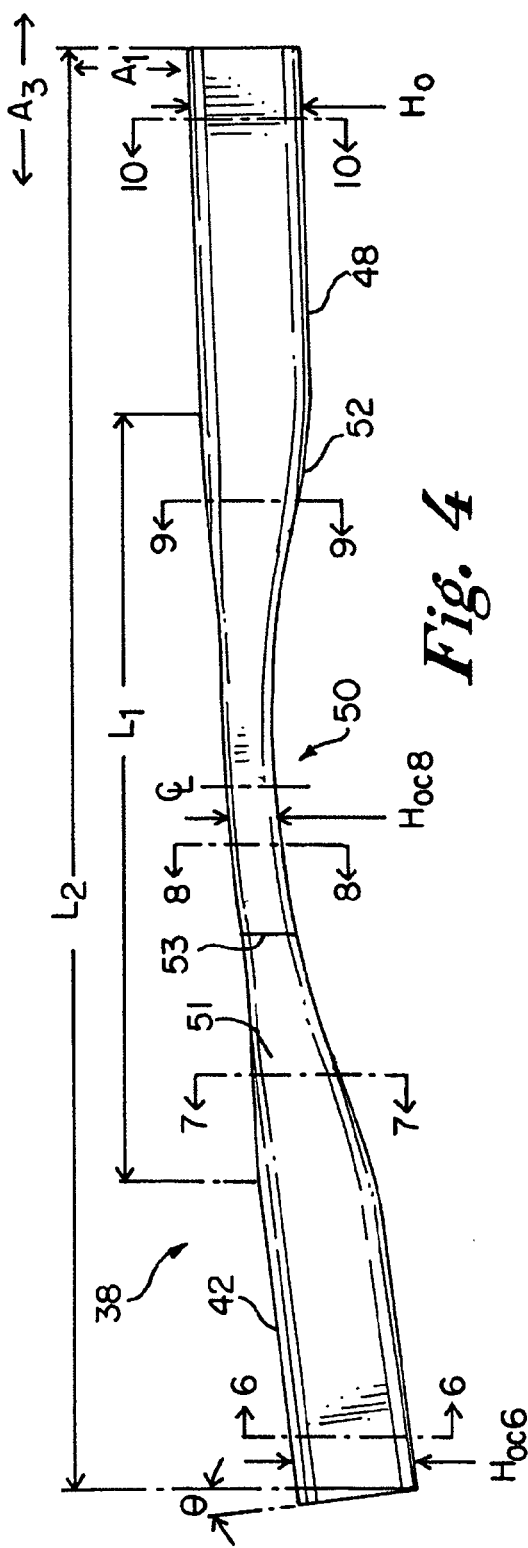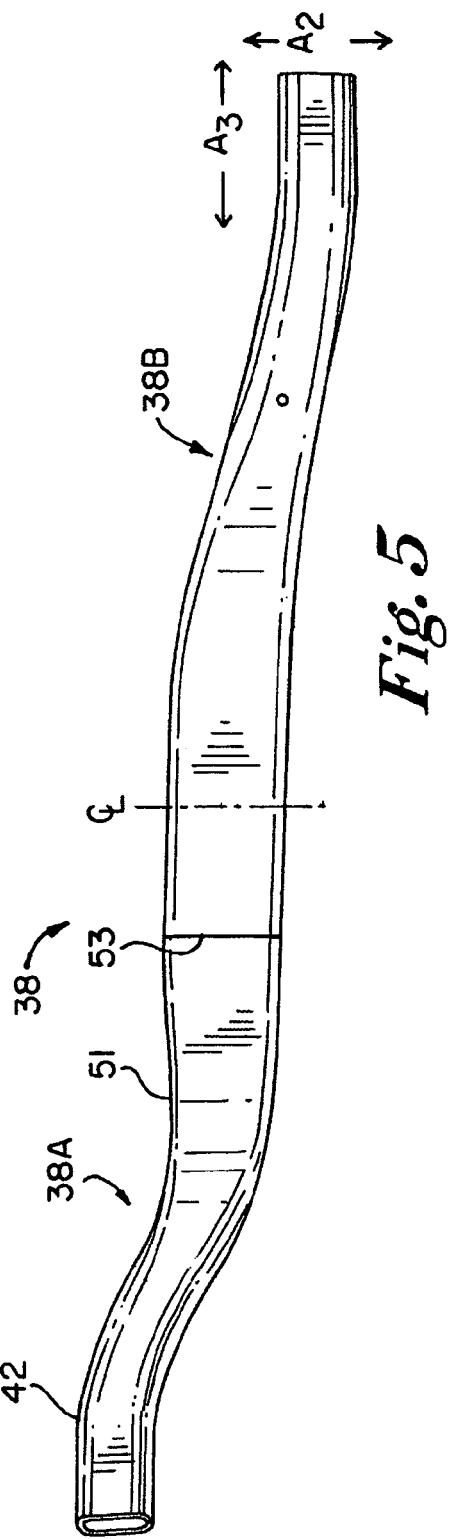
Fig. 4
Fig. 5

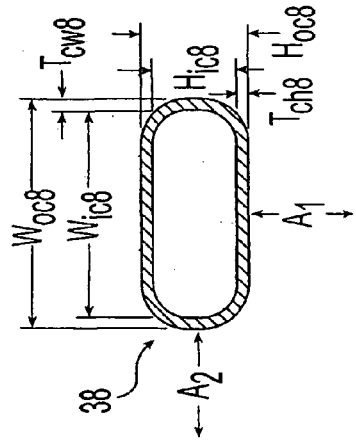
Fig. 6
Fig. 7
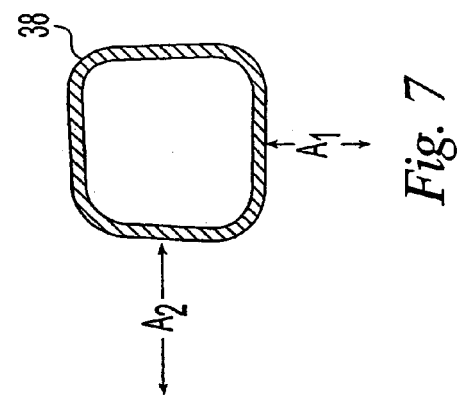
Fig. 8
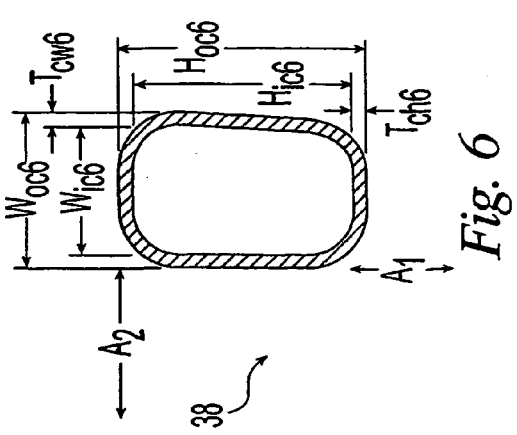
Fig. 9
Fig. 10
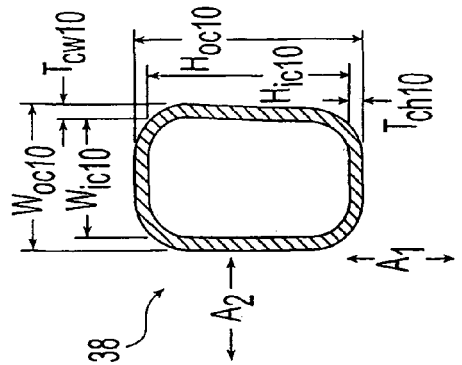

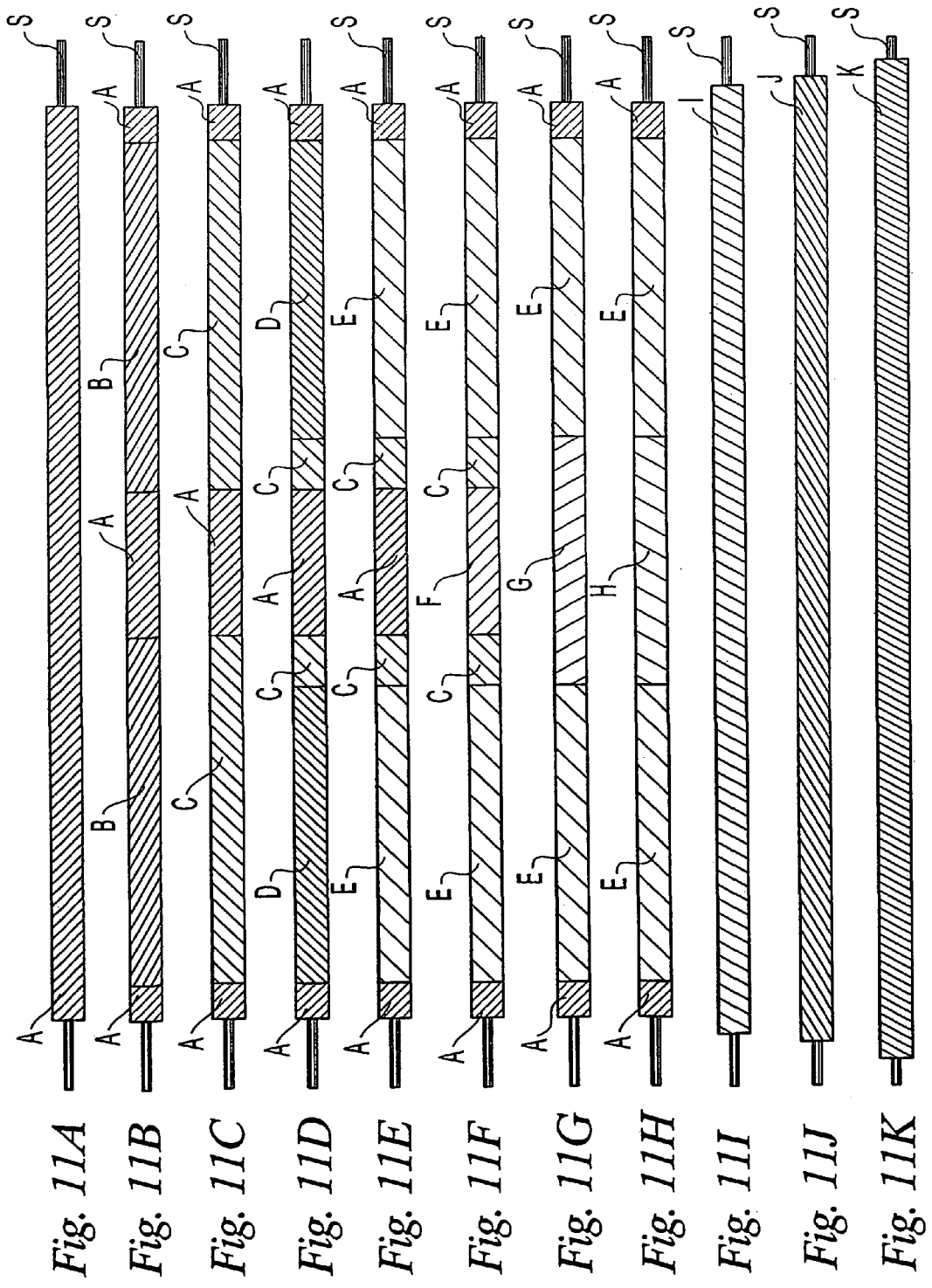

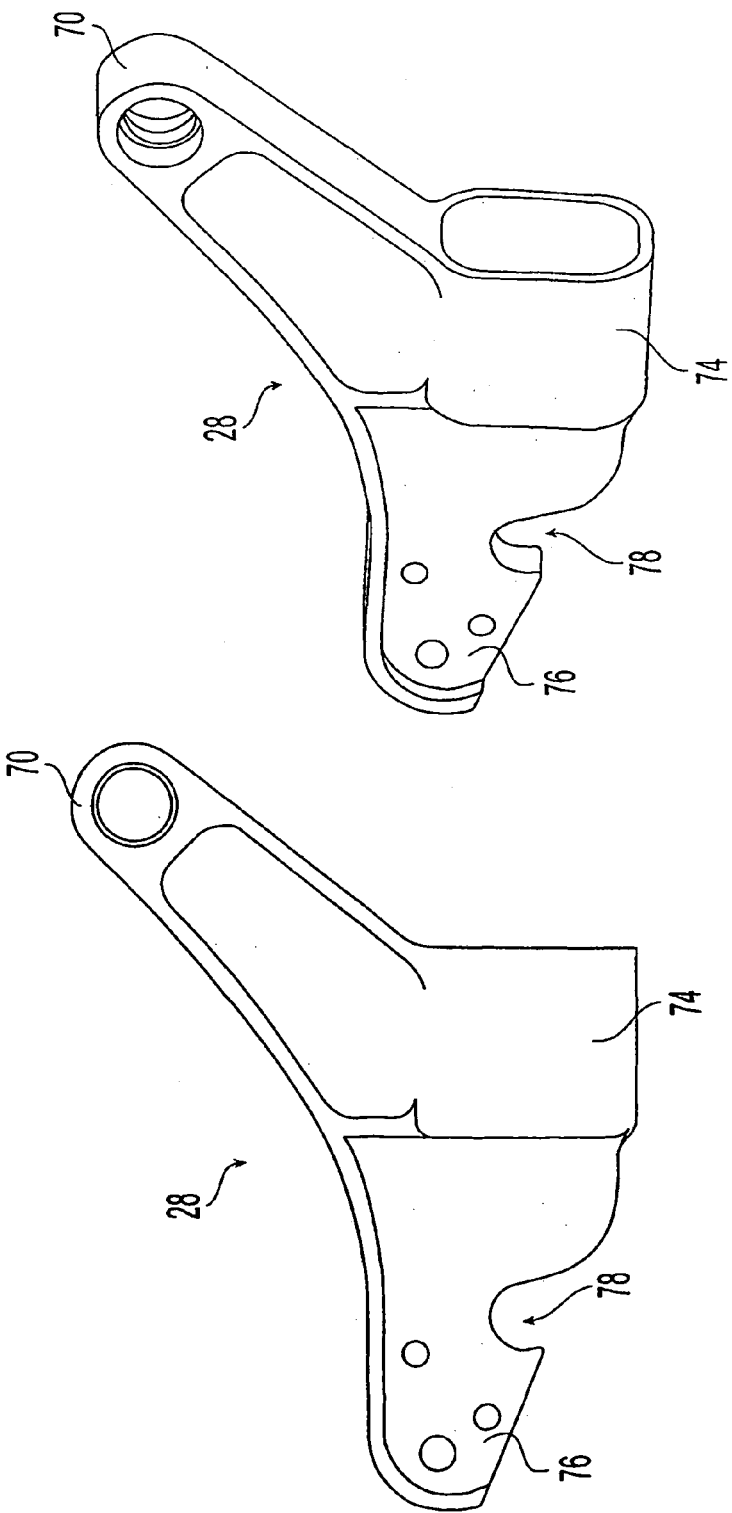

LIVING HINGE MEMBER AND SUSPENSION

CROSS-REFERENCE TO RELATED APPLICATIONS

This application is a continuation of U.S. patent application Ser. No. 10/258,675, filed Oct. 25, 2002.

TECHNICAL FIELD OF THE INVENTION

This invention relates generally to a flexural structural member and a method of making a flexural structural member. More particularly, the invention is directed to a chain stay for use in a rear suspension of a bicycle frame.

BACKGROUND OF THE INVENTION

Conventional bicycle frames use tubes joined into closed frameworks to interconnect the components (front fork/handlebar assembly, seat, crankset, rear wheel) and transmit the loads therebetween. The tubes also keep the components in spacial relation to one another, i.e., they maintain the components in relative proximity.

The traditional bicycle frame includes a top tube, a relatively short head tube, a seat tube, a down tube, a bottom bracket, a pair of chain stay tubes, a pair of dropouts, and a pair of seat stays. The top tube connects at its front end to the top of the head tube, and extends backward to the top of the seat tube. The down tube connects at the front end to the bottom of the head tube and extends downwardly and rearwardly to the bottom bracket where the seat tube and the down tube are connected. The pair of chain stay tubes extend rearwardly from the bottom of the seat tube to the dropouts. The chain stay tubes are generally connected to a bottom bracket at the base of the seat tube. The pair of seat stays connect directly or indirectly to the top of the seat tube. The seat stays extend backward from the seat tube to the dropouts. The seat stays generally include two seat stay tubes that converge from the dropouts toward the seat tube. The dropouts support the rear wheel axle. This conventional frame design is called the "diamond" frame, because when viewed from the side, the top tube, down tube, chain stay tubes, and seat stays enclose a diamond-shaped space.

The rear portion of conventional rigid frames are made up of a pair of generally horizontal chain stay tubes that are welded at their front ends to the bottom bracket and are adapted to receive the rear wheel axle near their rear ends. A pair of seat stays are welded at their upper ends near the top of the seat tube and are welded near the ends of the chain stay tubes at their lower ends. The seat tube, chain stay tubes, and seat stays form a rigid generally triangular configuration, with the rear wheel carried at the rear apex.

Such frames are used for both road bikes and mountain bikes. The terrain on which a bike is used dictates the load requirements for the bike and the performance characteristics of the components. For example, since mountain bikes are used on rough terrain and often are ridden over roots and jumps, they must be more durable than road bikes, which encounter relatively smooth surfaces. Further, the conventional rigid arrangement is unsatisfactory for comfort and optimum performance on rough terrain. Thus, provision of a pivoting spring suspension for the rear wheel is desirable on a bicycle to be used on rough terrain, such as mountain bikes, cross-country bikes or trail bikes.

Some prior art bicycles have rear shock absorbing assemblies in which the rear axle pivots about a single elevated pivot point when subjected to a shock force. This generally results in the rear wheel axle moving upwardly in an arc rather than moving vertically upward in a substantially linear fashion.

To accommodate a rear suspension, some bicycles have a rear suspension linkage system, including an upper link to which the seat stays are pivotally attached at an upper end adjacent the seat tube, while the chain stay tubes are pivotally attached to the bottom bracket at a forward end and a rear pivot axis adjacent the hub of the rear wheel at a back end. The lower end of the seat stays are pivotally attached to the back end of the chain stay tubes. Typically, a shock absorber is located at the upper end of the seat stay, such that the shock absorber is rigidly connected to the seat stay at one end with the other end being pivotally attached to the seat tube. These linkage systems have several drawbacks in that they are mechanically complicated, require a large number of parts, and add unwanted weight. Therefore, a need exists for a rear suspension that uses less complicated and light weight linkage systems.

Other rear suspensions for "soft-tail" designs of bicycles use the flex of chain stay tubes for suspension; however, they bend along the length of the chain stay tubes. When chain stay tubes flex over their entire length, it is difficult to dictate the performance characteristics of the rear suspension. This can be accomplished, however, by isolating the specific location where the chain stay tubes bend. Therefore, a need exists for a chain stay tube that pivots around a specific point.

SUMMARY OF THE INVENTION

One embodiment of the invention relates to a structural member having a longitudinal axis. The structural member includes a first portion having a first composite layup, a second portion having a second composite layup, and at least one center portion having at least a third composite layup and disposed between the first portion and the second portion. The first, second, and center portions are formed integrally into the structural member and are configured and dimensioned to flex at or in the vicinity of at least one desired point along a length of the structural member allowing displacement relative to a longitudinal axis of the structural member.

At least one of the first composite layup, the second composite layup or the third composite layup may include at least one layer of carbon braid. Alternatively, at least one of the first composite layup, the second composite layup or the third composite layup may include at least one layer of glass fibers.

Also, at least one of the first composite layup, the second composite layup or the third composite layup may include a matrix of at least a plurality of fibers and a binder. The binder may be a resin and the plurality of fibers may be at least one of glass or carbon. Furthermore, the plurality of fibers of glass may be aligned parallel to the longitudinal axis of the structural member or the plurality of fibers of carbon may be braided in strands at a ±45° angle relative to the longitudinal axis of the structural member.

Additionally, at least one of the first composite layup, the second composite layup or the third composite layup may be formed of at least two layers of material. Furthermore, a plurality of layers of materials may be provided in each portion and at least some of the plurality of layers of material overlap between the portions. Also at least one layer of material may have a different longitudinal length than the other layers of material.

Also, the first composite layup, the second composite layup and the third composite layup may be substantially the same. Alternatively, the first composite layup and the second composite layup may be substantially the same.

Furthermore, the structural member may be a chain stay.

Additionally, at least one of the center portion, the first portion, or the second portion may have a cross-sectional area different from the other portions.

Also the structural member may further include a first section, a second section, and at least one center section connecting the first and second sections such that at least one of the center section, the first section, or the second section may have a cross-sectional area different from the other sections.

The structural member may also include a reinforcement associated with it. The reinforcement may be provided inside the structural member. The reinforcement may also be at least one of aluminum, balsam wood, plastic and structural foam and is positioned inside the structural member. Furthermore, the reinforcement may be associated with at least the first, second or center portions.

Additionally, the center section may further include an arc having a length and the structural member has an overall length and the ratio of the overall length of the arc to the length of the structural member may be at most 0.3. Alternatively the structural member further includes a first height of the center section, and a second height of the first or second sections, where the ratio of the height of the center section to the height of the first or second sections may be at least 0.3. Also, the structural member further includes a first width of the center section, and second width of the first or second sections, where the ratio of the width of the center section to the width of the first or second sections may be at least 1.3.

Another embodiment relates to a bicycle frame that includes a front portion for locating a steering assembly, a seat assembly and a pedal assembly in spacial relation to each other, a rear portion and a pair of chain stay tubes according to structural member above. The rear portion is connected to the front portion and include a bottom bracket for operatively connecting the pedal assembly, a pair of dropouts spaced from the bottom bracket, and a pair of seat stay tubes coupled adjacent to the seat assembly and extending generally rearwardly and downwardly to the associated dropout. The pair of chain stay are spaced from one another and extending generally rearwardly from the bottom bracket to the associated dropout.

The frame may be pre-loaded for flex in a positive and negative direction such that a total travel of each chain stay tube is greater than the displacement in either the positive or negative direction from the longitudinal axis.

The chain stay tube in the frame may include a first portion having a first composite layup, a second portion having a second composite layup, and at least one center portion having a third composite layup and disposed between the first and second portions. At least one of the first composite layup, the second composite layup or the third composite layup may include at least one layer of carbon braid or uniglass.

Another embodiment of the invention relates to a frame that includes a front portion for locating a steering assembly, a seat assembly and a pedal assembly in spacial relation to each other and a rear portion connected to the front portion. The rear portions includes a bottom bracket for operatively connecting the pedal assembly, a pair of dropouts spaced from the bottom bracket a pair of seat stay tubes coupled adjacent to the seat assembly and extending generally rear-wardly and downwardly to the associated dropout, and a pair of chain stay tubes spaced from one another and extending generally rearwardly from the bottom bracket to the associated dropout. The chain stay tube is a structural member as discussed in the previous embodiment.

Yet another embodiment of the invention relates to a structural member that is a tubular member configured and dimensioned by at least one of its geometry, cross-sectional geometry, thickness, and material variations to flex at or in the vicinity of at least one desired point along a length of the structural member allowing bending displacement relative to a longitudinal axis of the structural member.

Another embodiment relates to a chain stay for a bicycle frame that includes a composite tubular member having a length and being formed from a plurality of layers of material. The layers include a first inner layer extending along a predetermined length, at least one second layer positioned over the first layer and formed as two second portions spaced apart from one another and positioned substantially at the ends of the tubular member, at least one third layer positioned over the at least one second layer and formed as two third portions spaced apart from one another and positioned substantially at the ends of the tubular member, at least one fourth layer positioned over the at least one third layer and centered on the first member and extending partially along the predetermined length of the first layer and at least one fifth layer positioned over the at least one fourth layer and centered on the first layer.

The at least fifth layer may extend the length of the tubular member to substantially cover the first inner, the at least one second, the at least one third and the at least one fourth layers. Alternatively, the at least one fifth layer may include a total of three layers, each of which has a length equal to or greater than the length of the tubular member. Furthermore, at least one of the at least one second layer, the at least one third layer, and the at least one fourth layer may overlap.

BRIEF DESCRIPTION OF THE DRAWINGS

FIG. 4 is a side view of the chain stay tube in accordance with this invention;

FIG. 5 is a top view of the chain stay tube of FIG. 4;

FIG. 6 is a cross-sectional view of the chain stay tube of FIG. 4 taken at line 6—6;

FIG. 7 is a cross-sectional view of the chain stay tube of FIG. 4 taken at line 7—7.

FIG. 8 is a cross-sectional view of the chain stay tube of FIG. 4 taken at line 8—8;

FIG. 9 is a cross-sectional view of the chain stay tube of FIG. 4 taken at line 9—9;

FIG. 10 is a cross-sectional view of the chain stay tube of FIG. 4 taken at line 10—10;

FIGS. 11A–K are schematics of the individual layers applied to a mandrel to form a preform;

FIG. 18A is a side view of the right dropout in accordance with this invention;

FIG. 18B is a perspective view of the right dropout of FIG. 12A;

DETAILED DESCRIPTION OF THE PREFERRED EMBODIMENTS

Figure 1:
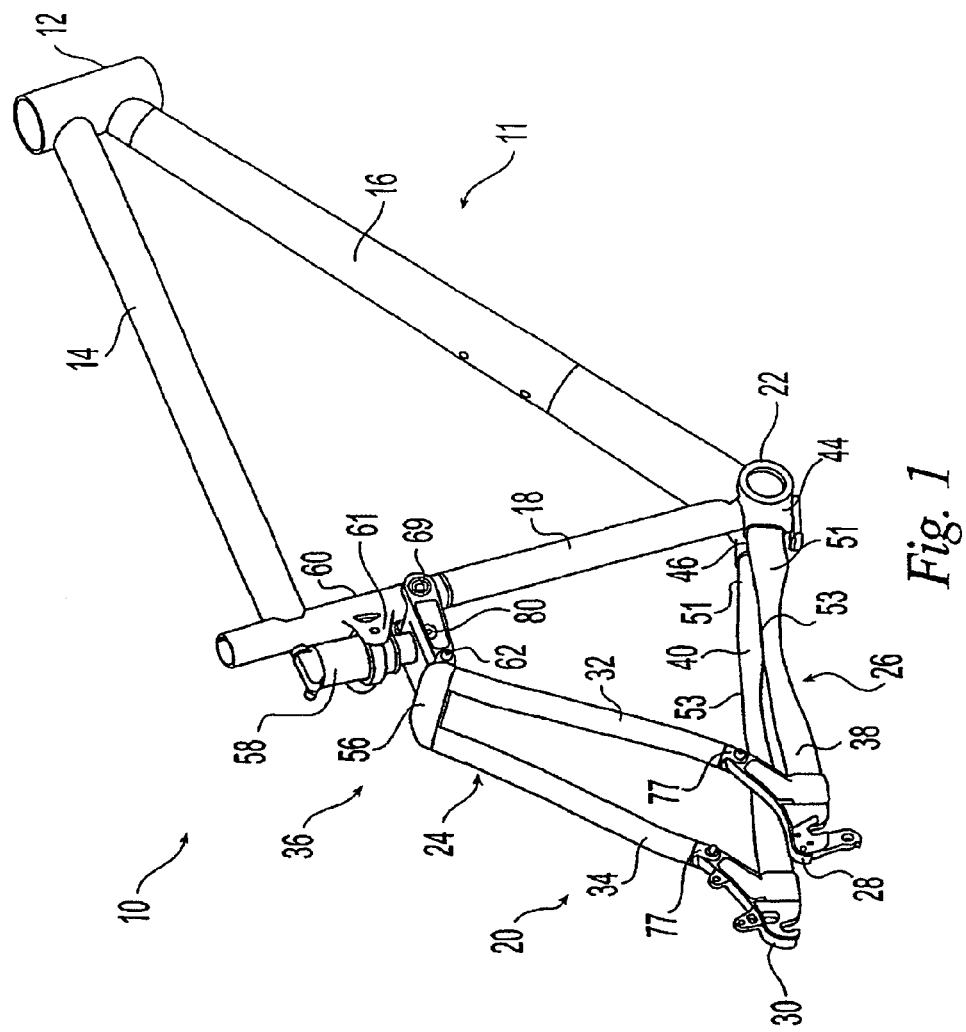
FIG. 1 is a rear, perspective view of a preferred embodiment of a bicycle frame in accordance with this invention.
Figures 2A, 2B:
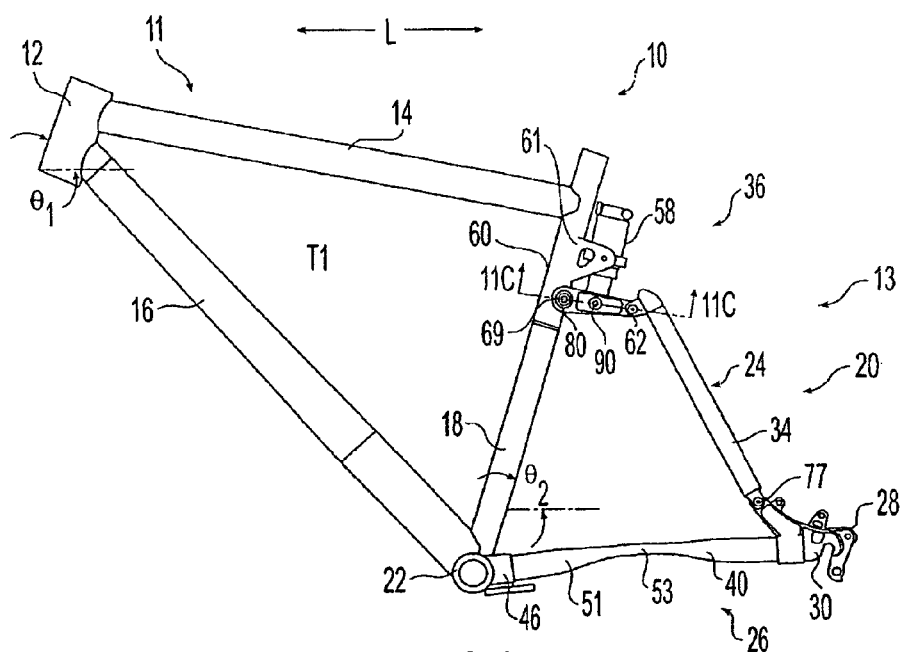
FIG. 2A is a left side view of the frame of FIG. 1.
FIG. 2B is a right side view of the frame of FIG. 1.
Figure 3:
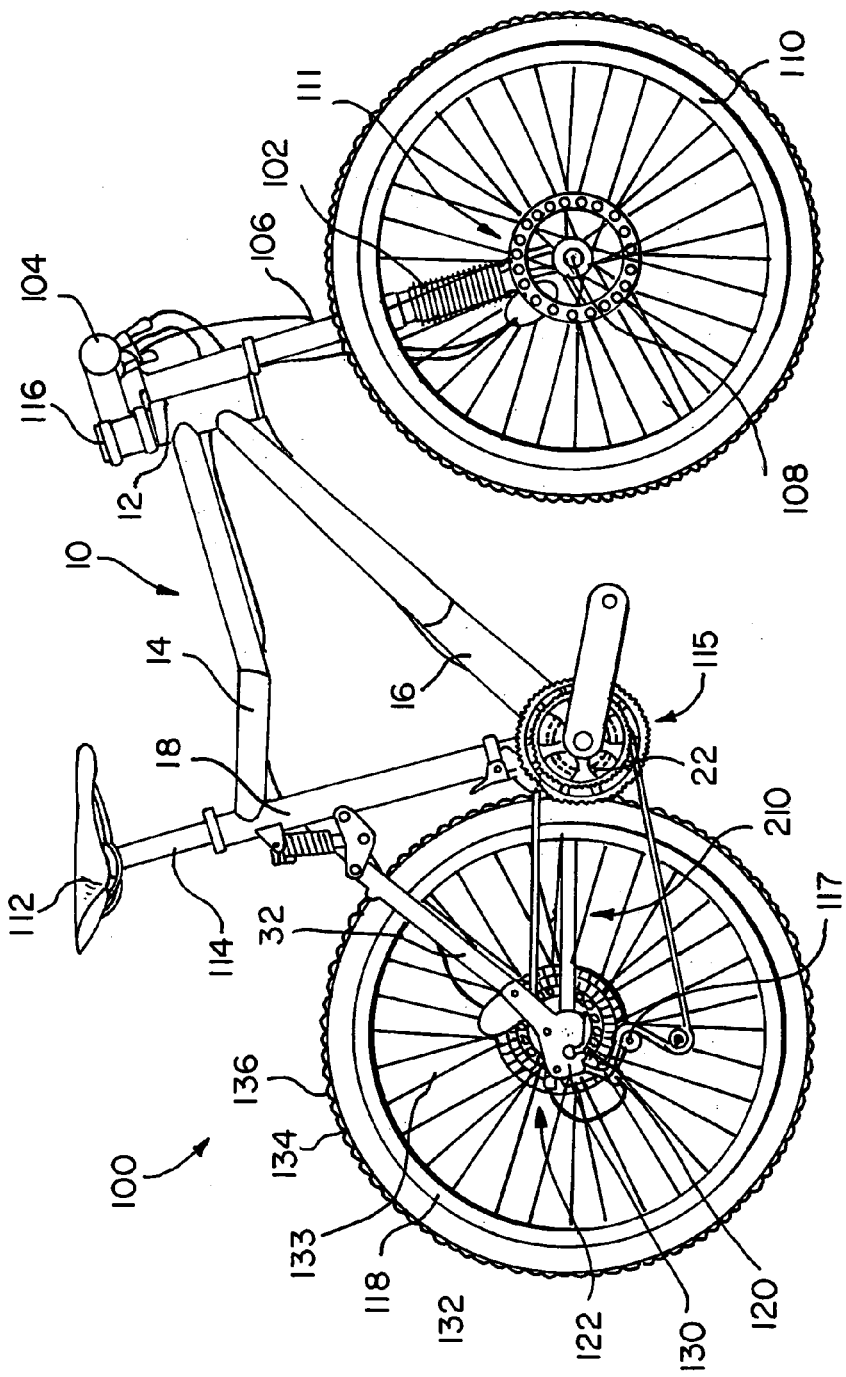
FIG. 3 is a side view of a bicycle incorporating the frame of FIG. 1.

FIGS. 1–3 illustrate an embodiment of bicycle frame 10 in accordance with the present invention. While the present invention is discussed in detail in connection with its application to a chain stay for use in a bicycle, it should be understood that the present invention should not be considered to be limited to a bicycle frame or application. The present invention may be useful in any number of different types of applications, such as, but not limited to, bicycles, motorcycles, automobiles or airplanes, or any other types of equipment that may require a structural member that flexes at a desired point(s) or location(s). Thus, the fact that the present invention is discussed in connection with its use as a chain stay tube should not % be construed to limit the invention, in any way, to the bicycle art.

As shown in FIGS. 1–3, the bicycle frame includes a front portion 11 and a rear portion 13. The front portion is configured to locate a steering assembly, a seat assembly and a pedal assembly in proper spacial relation to each other. The rear portion 13 is connected to the front portion 11 and provides a rear suspension assembly 36 and support for rotatably mounting the rear wheel (not shown). The first portion 11 preferably includes a head tube 12, a top tube 14, a down tube 16, and a seat tube 18. The rear portion preferably includes a seat stay assembly 24, a chain stay assembly 26 and a shock or rear suspension assembly 36. In the preferred embodiment, as shown in FIGS. 1 and 2, the bicycle frame 10 is a "diamond" type frame and includes the head tube 12, the top tube 14, the down tube 16, the seat tube 18, and a rear portion 13 of the frame including a rear triangle assembly 20. The head tube 12 is generally vertical. Preferably, the head tube 14 is located at an angle $\phi_1$ from a longitudinal axis L of the frame 10 (shown in FIGS. 2A and B), most preferably $\phi_1$ is about 71°. The top tube 14 extends rearwardly from the top of the head tube 12 and ends at a first portion on the seat tube 18. In this preferred embodiment, the first position is near the upper end of the seat tube 18, however the first portion can be elsewhere such as centrally disposed on the seat tube 18.

In the preferred embodiment, the down tube 16 extends rearwardly from the bottom of the head tube 12. The seat tube 18 is generally vertical and has a bottom bracket 22 connected to the lower end. Preferably, the seat tube 18 is located at an angle $\phi_2$ from a longitudinal axis L of the frame 10, most preferably $\phi_2$ is about 73.5°. The down tube 16 is joined to the bottom bracket 22 and the bottom of the head tube 12. As shown in FIGS. 2A–B, the head tube 12, top tube 14, down tube 16 and seat tube 18 preferably form a first substantially triangular region T1.

As shown in FIGS. 1–2B, the rear triangle assembly 20 generally includes the seat stay assembly 24, the chain stay assembly 26, and a pair of rear dropouts or brackets 28,30. The seat stay assembly 24 includes a pair of seat stay tubes 32,34 that are coupled to the top tube 14 through the seat tube 18. The seat stay tubes 32,34 extend from opposite sides of the top of the seat tube 18 and end at the dropouts 28,30, respectively. Preferably, as shown in FIGS. 1–3, the shock or rear suspension assembly 36 is mounted between the seat stay tubes 32,34 and the seat tube 18. The chain stay assembly 26 includes a pair of chain stay tubes 38,40. However, the frame does not have to be limited to one pair of chain stay tubes. The frame could have more than one pair of chain stay tubes. The chain stay tubes 38,40 extend from the bottom bracket 22 and end at the dropouts 28,30, respectively.

As shown in FIG. 3, an embodiment of a bicycle 100 according to the present invention generally includes the inventive frame 10. The bicycle includes components that are available in the industry, such as for example wheels, a steering assembly, a seat assembly, and a pedal assembly. For example, the head tube 12 has a suspension system 102 mounted thereon. One end of the suspension system 102 has the handlebars 104 connected thereto, and the other end has front fork 106 extending outwardly and downwardly therefrom. The front fork 106 has the front wheel axle 108 secured thereto for rotatably supporting a front wheel 110. The seat tube 18 accepts seat 112 mounted on a standard seat post 114, and the bottom bracket 22 accepts a pedal assembly 115 that includes a crankset. A front brake assembly 111, gears and shifters 116, and chain 117 are also used with the bicycle 100. The bicycle 100 further includes a rear wheel 118 whose axle 120 is supported by the dropouts 30,28 (shown in FIGS. 2A–B). The bicycle 100 also includes a disc brake assembly 122. These components are known in the art. While a particular configuration of these parts is shown in the drawings, the claims are not to be viewed as limited to these particular configurations.

One recommended disc brake assembly that is commercially available is manufactured by CODA under the name Compact Disc Brake. However, other bicycle disc brakes can be used with the frame 100 of the present invention, such as those with cables. The rear wheel 118 includes a hub 130, a rim 132, a plurality of spokes 133, a tire 134 and an inner tube 136.

The bicycle 100 having frame 10 and chain stay tubes 38,40 preferably meet the requirements of DIN 79100, which are bicycle standards known in the art. The DIN 79100 requirements are utilized in the testing of bicycles to make sure the bicycle and its parts can satisfy the predetermined load carrying capacities. Thus, the chain stay tubes 38,40 are designed to not fail or break under the DIN 79100 standards.

Figure 5A:
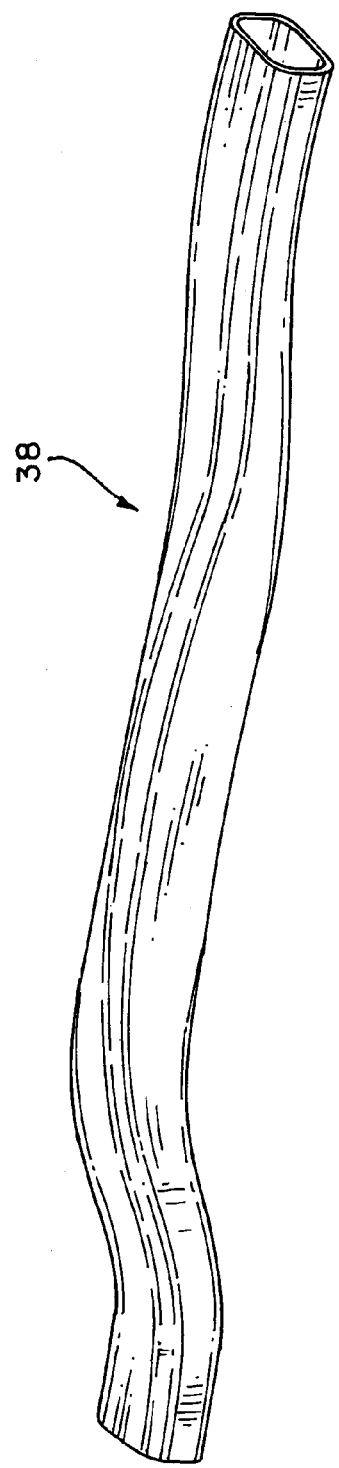
FIG. 5A is a perspective view of the chain stay tube of FIG. 4.

FIG. 4 shows chain stay tubes 38,40. Each chain stay tube is preferably a hollow tube made of one or more pieces. The chain stay tube 38,40 references three axii, A1 and A2 are perpendicular to one another. The first axis A1 (shown in FIG. 4) extends vertically and the second axis A2 (shown in FIG. 5) extends laterally. An axis A3 extends longitudinally along the length of the chain stay tube parallel to the length of the chain stay tube 38,40. As shown in FIG. 4, the chain stay tube 38,40 has a slight overall curvature such that a first end 42 of the chain stay tube 38,40 is at an angle θ from the axis A1. Preferably, the geometry of the chain stay tube 38,40 is such that they flex or bend near the center $C_c$ of the chain stay tube 38,40. Also the chain stay tube 38,40 is preferably made of a composite material having a particular layup to facilitate flexing or bending at a desired location along the length of the chain stay tube. The geometry and make up of the chain stay tube could be configured to locate the flex or bend at any desired location along the chain stay tube 38,40. Alternatively, based upon the geometry and make up of the chain stay tube, the chain stay tube may be configured to have more than one flex or bend point. Because the chain stay tube 38,40 can flex or bend at any desired location, the need for a pivot assembly with, in, or along the chain stay tube advantageously can be eliminated. As such, the flexing or bending chain stay allows for a lighter bicycle.

Preferably, the chain stay tubes 38,40 are pre-loaded for flex in both a positive and a negative direction in relation to axis A3, such that the total possible travel of the chain stay tubes 38,40 are greater than the displacement of the chain stay tubes 38,40 in either the positive or negative direction. The chain stay tubes 38,40 can be pre-loaded by any distance, preferably the chain stay tubes 38,40 are pre-loaded by at least one-quarter inch. If the chain stay tubes 38,40 are pre-loaded in a negative or downward direction, in relation to the longitudinal axis A3, by for example, one inch and have one and one-half inches of travel upward beyond the non-loaded position, then there is two and one-half inches of total travel. However, the displacement or distance the chain stay tubes 38,40 are moved in either direction beyond the longitudinal axis A3 is a maximum of one and one-half inches. This reduces stress on the chain stay tubes 38,40.

The chain stay tubes may be pre-loaded by first bonding the chain stay tubes 38,40 into the frame 10 with no load applied to the chain stay tubes 38,40. Then as air is put into the shock assembly 58, the shock assembly extends causing the chain stay tubes 38,40 to be pushed down. This results in the chain stay tubes 38,40 being pre-loaded in the negative direction.

The chain stay tubes 38,40 are designed preferably having a varying cross-sectional area. The center of the chain stay tubes have a shorter height, as shown from the side view of FIG. 4, than the ends of the chain stay allowing the chain stay preferably to flex parallel with axis A1. Additionally, the center has a greater width, as shown from the top view of FIG. 5 and the perspective view of FIG. 5a, than the ends of the chain stay for additional torsional and lateral stiffness along the axis A2. The shorter height and greater width allows that area to flex and mimic a pivot.

Figure 19:
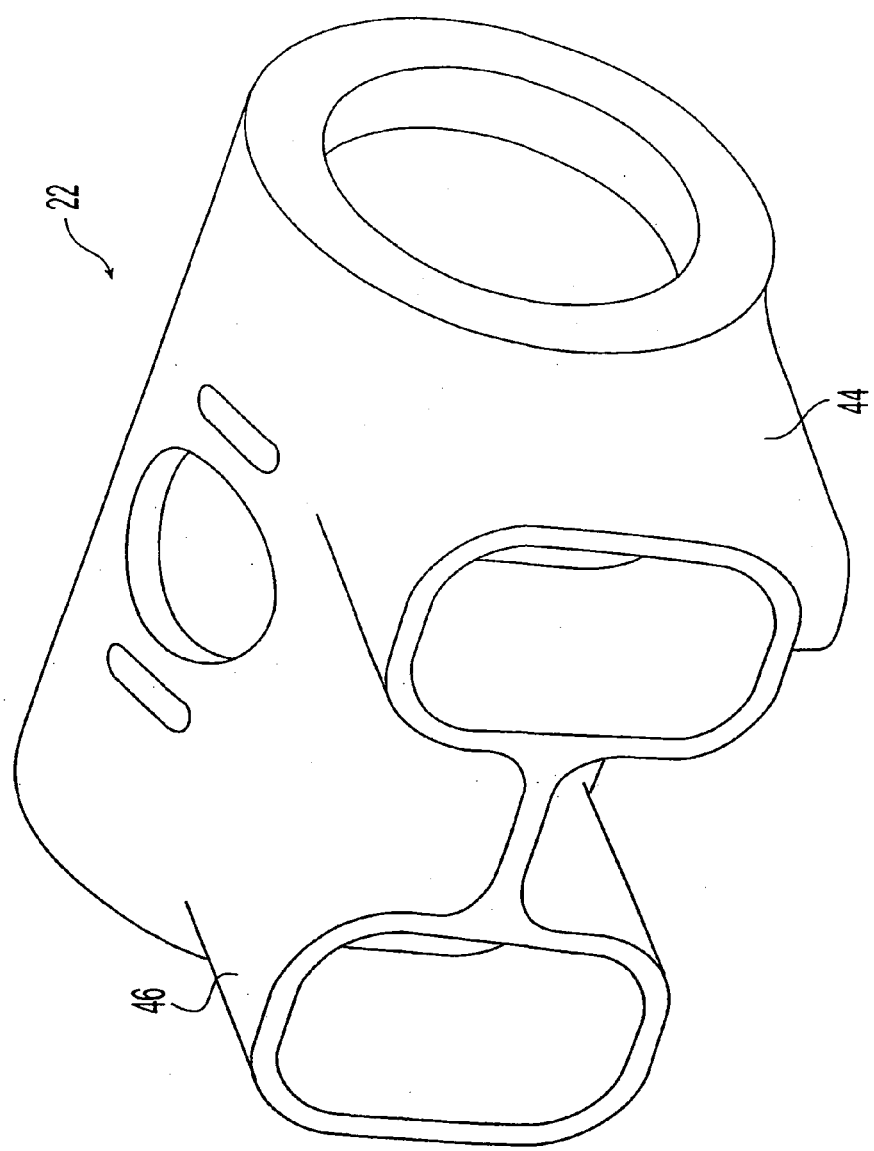
FIG. 19 is a perspective view of the bottom bracket in accordance with this invention.

Referring to FIGS. 4–10, chain stay tube 38,40 is shown with a variety of cross-sections along the length of the chain stay tube 38,40. FIG. 5 shows a top view of the chain stay tube 38,40. Preferably, as shown, the chain stay includes two S curves, 38A and 38B, that assist in locating the chain stay tube 38,40 in a closer proximal relation to the associated dropout. Referring to FIGS. 1–2B, preferably a first end 42 (shown in FIGS. 4 and 5) connects with the bottom bracket, by inserting the first end within a bottom bracket extension piece 44 (shown in FIGS. 1 and 19). FIG. 19 shows an embodiment of a bottom bracket 22, which operatively connects the pedal assembly. Two bottom bracket extension pieces 44,46 extend from the bottom bracket 22 to receive the chain stay tubes 38,40 and attach them to the frame 10.

Preferably, there is one inch of overlap between the chain stay tube 38,40 and the bottom bracket extension piece—and the parts are secured together using adhesive. The second end 48 of the chain stay tube 38,40 is secured to the associated dropout, discussed in more detail below.

As shown in FIG. 4, from the side view of the chain stay tube 38,40, the height $H_{OC6}$ and $H_{OC10}$ of the first and second ends of the chain stay tube 38,40 varies from the center height $H_{OC8}$, because of an arc 50 provided along a lower edge 52 of the chain stay tube 38, 40 between the first and second ends 42 and 48 of the chain stay tube 38,40. The arc has a length $L_1$ and the chain stay tube 38,40 has an overall length $L_2$.

As shown, preferably bottom bracket portion 51 of the chain stay tube 38,40 has an increased thickness starting at point 53 and towards first end 42. Providing a thicker portion the chain stay tube 38,40 assists in withstanding the stresses on the chain stay tube 38,40. Further, the thicker portion assures that the flex in the chain stay tube 38,40 occurs in the flatter section of the chain stay, having the shorter height and greater width, than towards the bottom bracket end of the chain stay tube 38,40. The increased thickness is achieved by the layering of additional composite material.

Now referring to cross-sectional views of the chain stay tube 38,40 shown in FIGS. 6–10, the varying cross-sectional area along the length of the chain stay tube 38,40 is apparent. The geometry of the chain stay tube 38,40 allows it to bend and mimic a pin joint. The cross sections of the first and second ends of the chain stay tube 38,40, taken at lines 6—6 and 10—10 from FIG. 4, are shown in FIGS. 6 and 10. The height is much greater than the width at these points. The cross sections of the curved sections, taken at line 7—7 and 9—9 from FIG. 4, of the chain stay tube 38,40 are shown in FIGS. 7 and 9. These have a more uniform height and width. FIG. 8, taken at line 8—8 from FIG. 4, shows the cross section of the center of the chain stay tube 38,40. The width is greater than the height of the chain stay tube at that point. Generally, the opposite sides of the various cross-sections of the chain stay tube 38,40 are of approximately equal thickness. However, the corners of the tube may vary in thickness.

Referring to FIG. 6, an outer and inner height (diameters) for cross section 6—6 are defined by the arrows $H_{OC6}$ and $H_{IC6}$, respectively, and are preferably parallel with the A1 axis. An outer and inner width (diameters) are defined by the arrows $W_{OC6}$ and $W_{IC6}$, respectively, and are preferably parallel with the A2 axis. A first wall thickness is preferably approximately equal to the outer height minus the inner height divided by two, and defined by the arrows $T_{CH6}$. A second wall thickness is preferably approximately equal to the outer width minus the inner width divided by two and defined by the arrows $T_{CW6}$.

Now referring to FIG. 10, an outer and inner height (diameters) for cross section 10—10 are defined by the arrows $H_{OC10}$ and $H_{IC10}$, respectively, and are preferably parallel with the A1 axis. An outer and inner width (diameters) are defined by the arrows $W_{OC10}$ and $W_{IC10}$, respectively, and are preferably parallel with the A2 axis. A first wall thickness is preferably approximately equal to the outer height minus the inner height divided by two, and defined by the arrows $T_{CH10}$. A second wall thickness is preferably approximately equal to the outer width minus the inner width divided by two, and defined by the arrows $T_{CW10}$.

As shown in FIG. 8, an outer and inner height (diameters) for cross section 8—8 are defined by the arrows $H_{OC8}$ and $H_{IC8}$, respectively, and are preferably parallel with the A1 axis. An outer and inner width (diameters) are defined by the arrows $W_{OC8}$ and $W_{IC8}$, respectively, and are preferably parallel with the A2 axis. A first wall thickness is preferably approximately equal to the outer height minus the inner height divided by two and defined by the arrows $T_{CH8}$. A second wall thickness is preferably approximately equal to the outer width minus the inner width divided by two, and defined by the arrows $T_{CW8}$.

The respective heights, widths and thicknesses for the first and second ends 42 and 48 of the chain stay tube 38, 40 can have the same or different values. Furthermore, it will be apparent that similar definitions may be made for the cross sections shown in FIGS. 7 and 9. Preferably, the geometry of the chain stays meets the following ratios:

$$\frac{L_1}{L_2} \leq .3 \text{ and } \frac{W_{OC8}}{W_{OC6}} \geq 1.3 \text{ or } \frac{W_{OC8}}{W_{OC10}} \geq 1.3 \text{ and}$$

$$\frac{H_{OC8}}{H_{OC6}} \geq .3 \text{ or } \frac{H_{OC8}}{H_{OC10}} \geq .3$$

More preferably, the ratio of the length of the chain stays is about 0.4 to about 0.6, the ratio of the heights is about 0.4 to about 0.5 and the ratio of the widths is about 1.4 to about 1.6. Most preferably, the ratio of the lengths of the chain stay is about 0.5, the ratio of the heights is about 0.43 and the ratio of the widths is about 1.5. However, it should be noted that other configurations are anticipated to work equally well.

The components of the bicycle frame 10 are formed of aluminum, carbon fiber, or other known material and are joined together by conventional techniques such as welding, soldering, brazing, fusing, bonding, gluing and the like, as known by those of ordinary skill in the art. The recommended material for the frame 10 is aluminum 6061-T6, which is commercially available from various manufacturers. However, any other materials known to those skilled in the art could also be used, such as steel, titanium, or composites. The dropouts and link are preferably made of magnesium, and most preferably forged magnesium.

As previously discussed, the chain stay tube 38,40 is preferably made of a composite material having a particular layup designed for each particular part or use. In one embodiment the layup is composed of a carbon reinforced composite thermoplastic material. In another embodiment the layup is composed of a glass and carbon reinforced composite thermoplastic material.

In the preferred embodiment, the method of making the chain stay involves the use of preformed sheets or tubes of material. The sheets or tubes are configured to include a plurality of fibers that are bundled in strands, and then the individual strands are either woven together to form a sheet, or are aligned and then additional strands are utilized to hold the strands together in an aligned manner.

One preferred material for use in the preformed sheets or tubes is carbon braid. Carbon braid may be formed in either sheets or a tube. In forming the carbon braid, numerous carbon fibers are gathered to form strands. These strands are preferably pretreated to coat the strands with a binder material, as will be discussed in greater detail below. Then the individual strands are woven. In a preferred material, the strands are woven at ±45° to form a woven braid.

Another material for use with the present invention is uniglass, which is preferably formed in sheets. In forming uniglass sheets, numerous glass fibers are bundled for form flattened strands. These strands are preferably pretreated to coat the strands with a binder material, which may be the same binder material applied to the carbon strands, or a different binder material. These individual strands are then aligned longitudinally so that each strand is substantially parallel to the next strand. These strands are then connected by smaller strands or fibers in the transverse direction. The fibers woven in the transverse direction are spaced from one another and are not used to provide much structure to the sheet. They are primarily utilized to hold the uniglass strands together before the composite material is formed.

The strands of material are, in a preferred embodiment, coated in some manner with a binder material, such as a resin. This binder is useful in melding the various layers together to form a cohesive part after heating and cooking (which will be described in greater detail below). A binder is applied to the strands such that it attaches to the individual fibers. Common impregnation methods for applying a binder are described in U.S. Pat. No. 5,756,206 to Davies et al. and U.S. Pat. No. 5,094,883 to Muzzy et al. the disclosure of each of which is incorporated by reference herein. However, other methods of impregnation can be used that are known to those of skill in the art, the invention not being so limited. Nylon 6 resin is a preferred binder, but other resins such as PP, PPS, PVDF, PET, PEEK and the like, as known by those skilled in the art, can be used to impregnate the carbon and glass fibers. Furthermore, if other types of materials are utilized, other than glass and carbon, other binders may also be preferred.

The impregnated glass fibers are joined, as discussed above, to form glass sheets. It is preferred that the glass sheets be uniglass. The uniglass sheets can be from a variety of sources, such as those manufactured by Applied Fiber Systems under part No. TFF-EGN6-102.

The impregnated carbon fibers, as previously discussed, are braided to make a sleeve or a sheet. It is preferred that the carbon is braided so that the fibers run at a 45° angle relative to the longitudinal length of the sheet or sleeve. The carbon braid sleeves or sheets can be from a variety of sources, such as those manufactured by Applied Fiber Systems under part No. TFBNC6-100.

While these materials form part of the embodiment, it should be noted that other materials are known by those of skill in the art and may be utilized in forming the claimed parts. These other materials are also believed to be encompassed by the present invention. In addition, improvements are likely to be made in the future, which will be useful in making the parts. Furthermore, while two different types of layers are discussed, more than two different types may be utilized, or a single type of material may be utilized. Different materials may be utilized in order to take advantage of their different physical properties in order to design the point(s) or location(s) or extent of flexing or bending.

To form the chain stay tube 38,40, first a preform must be made. This preform involves wrapping layers of materials around a mandrel. It is preferred that the mandrel is an inflatable bladder such as a silicone bladder. Preferably, the silicone bladder, when deflated, has a ⅝ inch outer diameter.

The process for forming the composite chain stay tube 38,40 is now discussed in connection with two specific examples. These examples are meant for demonstration purposes and are not meant to limit the present invention to a particular construction.

In one embodiment, to form the preform, first, one carbon tubular sleeve having a length preferably of about 18 inches is placed over a mandrel. Alternatively, a carbon sheet may be used such that the sheet is wrapped around the silicone bladder and then tacked in place by using a soldering iron or similar heating element to join the mating edges of the carbon sheet to form a first tubular layer. Then seven more layers of carbon sheet are wrapped around the preform. Each sheet is wrapped by tacking one edge of each sheet to the previous layer. Second, the carbon sheet is wrapped around the layer and tacked again to join the mating ends of the carbon sheet together to form the next layer. Furthermore, each individual carbon sheet has a length slightly larger than the previous sheet. This allows for the length of all the sheets after they are wrapped and tacked to be substantially the same.

In the second embodiment the layup is composed of a glass and carbon reinforced composite thermoplastic material. Table 1 gives more details on the different layers that are wrapped around the mandrel in the second embodiment. The chart shows what each layer is made of and how many sheets of material are used for each layer. Furthermore, the length of the sheet and its positioning are also shown. FIGS. 11A–K show schematics of the individual layers applied to a mandrel.

TABLE 1

| Layer | Material | No. of Sheets | Length of Sheet | Placement |
|---|---|---|---|---|
| 1 | Carbon | 1 | 18" | Centered |
| 2 | Uniglass | 2 | 7" | One sheet on each end spaced 1.25" from center |
| 3 | Uniglass | 2 | 7" | One sheet on each end spaced 1.25" from center |
| 4 | Uniglass | 2 | 6" | One sheet on each end spaced 2.5" from center |
| 5 | Uniglass | 2 | 6" | One sheet on each end spaced 2.5" from center |
| 6 | Carbon | 1 | 2.5" | Centered |
| 7 | Carbon | 1 | 6" | Centered |
| 8 | Carbon | 1 | 6" | Centered |
| 9 | Carbon | 1 | 19.5" | Centered |
| 10 | Carbon | 1 | 20.5" | Centered |
| 11 | Carbon | 1 | 21.5" | Centered |

In the second embodiment, to form the preform, first, one carbon tubular sleeve having a length preferably of about 18 inches is placed over a mandrel. Alternatively, a carbon sheet may be used such that the sheet is wrapped around the silicone bladder and then tacked in place by using a soldering iron or similar heating element to join the mating edges of the carbon sheet to form a first tubular layer. FIG. 11A shows a schematic of the first layer A around the silicone bladder S.

Next two uniglass sheets having a length of 7 inches are wrapped around the first layer at each end thereof and each sheet is placed 1.25" from the center of the preform to form a second layer. This is done by first tracking one edge of each sheet to the carbon layer. Second, the uniglass sheet is wrapped around the layer and tacked again to join the mating ends of the uniglass sheet together to form the second layer. FIG. 11B shows a schematic of the first layer A and the second layer B around the silicone bladder S.

Next, two more sheets of uniglass also having a length of 7 inches are tacked to the previous layer, wrapped and then tacked again to join the mating ends to form a third layer. These sheets are also placed on each end of the preform 1.25 inches from the center of the preform, thus being substantially on top of the second layer. This forms the third layer. FIG. 11C shows a schematic of the first layer A and the third layer C around the silicone bladder S.

Then two more sheets of uniglass are wrapped around the third layer. These sheets are 6 inches long and are placed on each end of the preform and spaced 2.5 inches from the center of the preform. The same tacking procedure is used to attach the sheets initially and then to join the mating ends. This forms a fourth layer. FIG. 11D shows a schematic of the first layer A, the third layer C and the fourth layer D around the silicone bladder S. Since the fourth layer sheets are shorter than the third layer sheets, the third layer sheets will be visible.

Next, two more sheets of uniglass having a length of 6 inches are wrapped in the same position as the fourth layer to form a fifth layer. The same tacking procedure is used to attach the sheet. FIG. 11E shows a schematic of the first layer A, the third layer C and the fifth layer E around the silicone bladder S. Since the fifth layer is substantially the same size as the fourth layer, the fifth layer substantially covers the fourth layer.

Next, a carbon sheet having a length of 2.5 inches is wrapped around the preform in the center thereof. This sheet is centered on the preform to form a sixth layer. The same tacking procedure is used to attach the sheet and to join the ends together. FIG. 11F shows a schematic of the first layer A, third layer C, the fifth layer E, and the sixth layer F around the silicone bladder S.

Then another carbon sheet having a length of 6 inches is wrapped around the preform and centered on the preform to form a seventh layer. Again, the same tacking procedure is used to attach the seventh layer and to join the ends together. FIG. 11G shows a schematic of the first layer A, the fifth layer E and the seventh layer G around the silicone bladder S. The seventh layer completely covers the sixth layer and overlaps part of the sheets of the fifth layer.

This same step is repeated again to form an eighth layer by applying a carbon sheet having a length of 6 inches centered around the preform. The eighth layer is substantially the same size as the seventh layer and thus substantially covers the seventh layer. FIG. 11H shows a schematic of the first layer A, the fifth layer E and the eighth layer H around the silicone bladder S.

Next, a ninth layer is formed by wrapping another carbon sheet having a length of 19.5 inches and which is centered on the preform. FIG. 11I shows a schematic of the ninth layer I around the silicone bladder S. The same tacking procedure is used to attach the sheet and to join the ends together. The same steps to make the ninth layer is repeated with a carbon sheet of 20.5 inches to form a tenth layer and then finally with a carbon sheet of 21.5 inches to form an eleventh layer. FIG. 11J shows a schematic of the tenth layer J around the silicone bladder S and FIG. 11K shows a schematic of the eleventh layer K around the silicone bladder S. Since the ninth through eleventh layers are all longer than the inner most first layer, they will completely cover the layers underneath and extend outwardly past the ends of the first layer.

It is also preferred that after some of the layers are added a film of resin, preferably nylon 6, is tightly wound around the layer to debulk the material. For example in the first embodiment, the film can be added after any of the eight layers, all of the layers, or only after the eighth layer. In the second embodiment, the film of nylon 6 can be added after each layer or only after the first and eleventh layers. The film can also be added after the first, eighth and eleventh layers or after the first, fifth, eighth and eleventh. While different examples of adding the film are discussed, the film can be added more or less times.

Once all the layers, including the nylon debulking film, are wrapped around the silicone bladder, it forms the finished preform. This finished preform is placed in a mold and then heated to about 450° F. Then the silicone bladder is inflated and the finished preform is heated to about 500° F. The finished preform in the mold is then placed in a cool press and cooled to about 200° F. Then the molded object is taken out of the mold and the silicone bladder is deflated and removed from the molded object. Any extra resin on the molded object is scraped off with a razor and then cut to a desired length. Then the molded object is grit blasted to prepare the surface for bonding. Then the molded object is cleaned and dried and bonded into the frame as the chain stay.

The chain stay, prior to being bonded into the frame, can also be internally reinforced. This aids in flexing of the chain stay at the desired point. It is preferred that aluminum is used for the internal reinforcement, however, other materials can also be used such as structural foam, balsam wood, plastic or any other materials known in the art. The reinforcement material is preferably bonded to the chain stay. The reinforcement can be along the length of the chain stay or at one portion of the chain stay.

For example, with the first embodiment, an aluminum, hollow, oval tube having a length of approximately 1.75 inches that is about 0.7 inches tall, about 0.5 inches wide, and about 0.03 inches thick may be bonded into the chain stay using acrylic adhesive. One acrylic adhesive that may be used is Plexus Brand MA310. Other bonding materials can be used that are known in the art. The aluminum reinforcement tube can be placed in the chain stay closer to the bottom bracket 22 opposite the dropouts 28,30 or alternatively placed closer to the dropouts 28,30. Furthermore, the chain stay can be reinforced near the bottom bracket and near the dropouts. Other dimensions, materials or locations for the reinforcement can be used and are not limited to the examples discussed. For example, the reinforcement may extend the entire length of the tube or only partially along the length. It may be positioned at both ends, or at a number of locations along the length. Types of reinforcement that may be used include aluminum tubing, balsam, adhesive, structural foam, plastic, or any other types of materials that may be inserted or otherwise injected into the inside of the tube. External reinforcements are also contemplated.

As evident from the above-described process of arranging the various sheets and layers, a preferred geometry of the part and thickness along its length, can be obtained by varying the position and length of the various layers. This technique can be used according to the invention to provide a structural member having a living hinge—a flex point at a desired location along the length that serves as a hinge.

The location and amount of bending provided by the living hinge can be varied by both the composite layup and the types of materials utilized. Moreover, the bending point can be varied along the length as well as axially or radially. For instance, more or thicker layers may be applied to one side of the part than the other such that the thickness will vary both longitudinally and radially or axially.

Figure 12A:
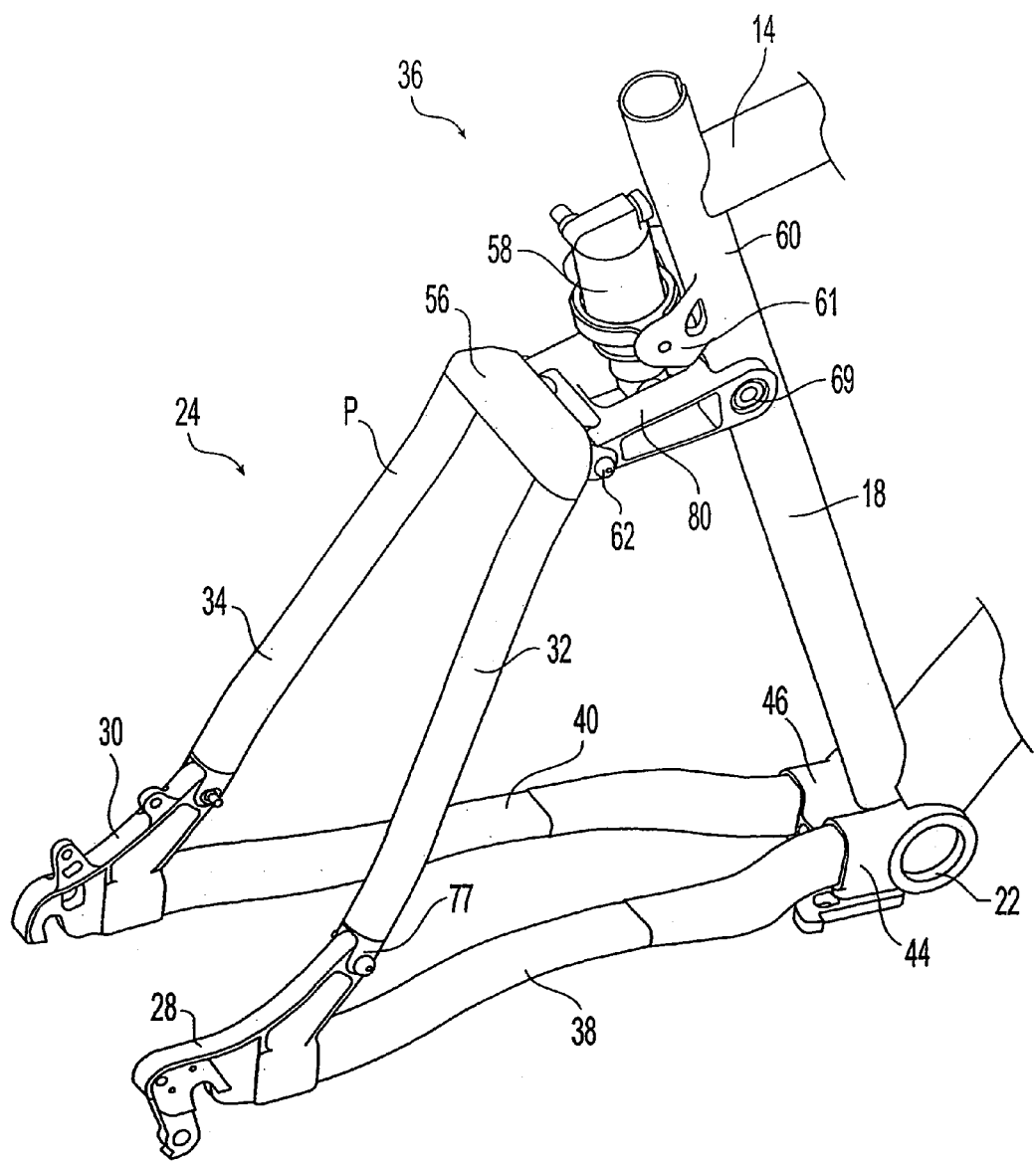
FIG. 12A is a perspective view of the rear portion of the frame.
Figure 15:
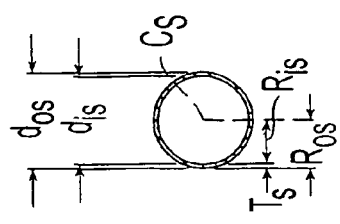
FIG. 15 is a cross-sectional view of the seat stay of FIG. 14 taken at line 14—14.
Figure 13:
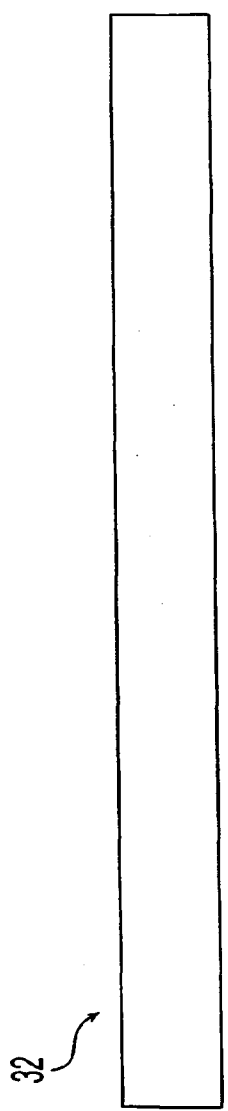
FIG. 13 is a top view of a seat stay in accordance with this invention.
Figure 14:
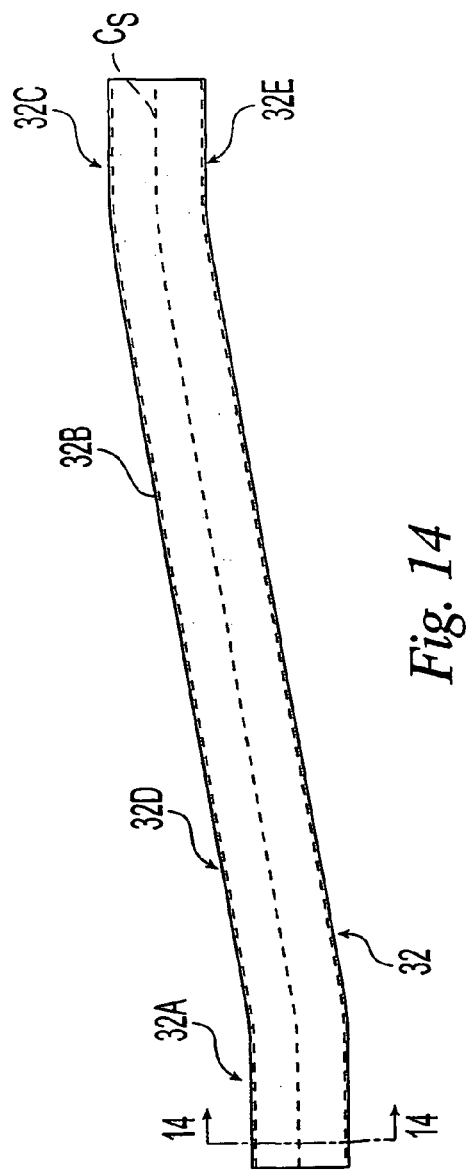
FIG. 14 is a side view of the seat stay in accordance with this invention.

Now referring to FIG. 12A, the seat stay tubes 32,34 converge toward one another from the dropouts to the seat tube 18. In FIG. 13, each seat stay tube 32,34 is formed as a single tube. As shown from the top view, the seat stay is preferably straight. However, the seat stays could include one or more bends when viewed from the top view. As shown in FIG. 14, the side view of the seat stays, the seat stays feature two very slight curves. The seat tube 18 has three straight sections 32A, 32B, and 32C connected by two curved tube sections 32D and 32E. Curved section 32D connects straight section 32A to straight section 32B, and curved section 32E connects straight section 32B to 32C. The curved sections assist in orienting the seat stays to attach with the dropouts and the rear suspension assembly. Referring to FIGS. 13–15, each annular seat stay tube 32,34 has an inner diameter represented by the arrows labeled $d_{IS}$ and the outside diameter is represented by the arrow $d_{OS}$. Referring to FIGS. 14 and 15, each seat stay tube 32,34 is a hollow tube having a center $C_s$. An outer radius of each seat stay tube is defined by the arrows $R_{OS}$. An inner radius of each seat stay tube is defined by the arrows $R_{IS}$. A wall thickness is equal to the outer radius $R_{OS}$ minus the inner radius $R_{IS}$ and defined by the arrows $T_S$. In another embodiment, the cross-section of the seat tube 18 may be a flattened tube.

Figure 12B:
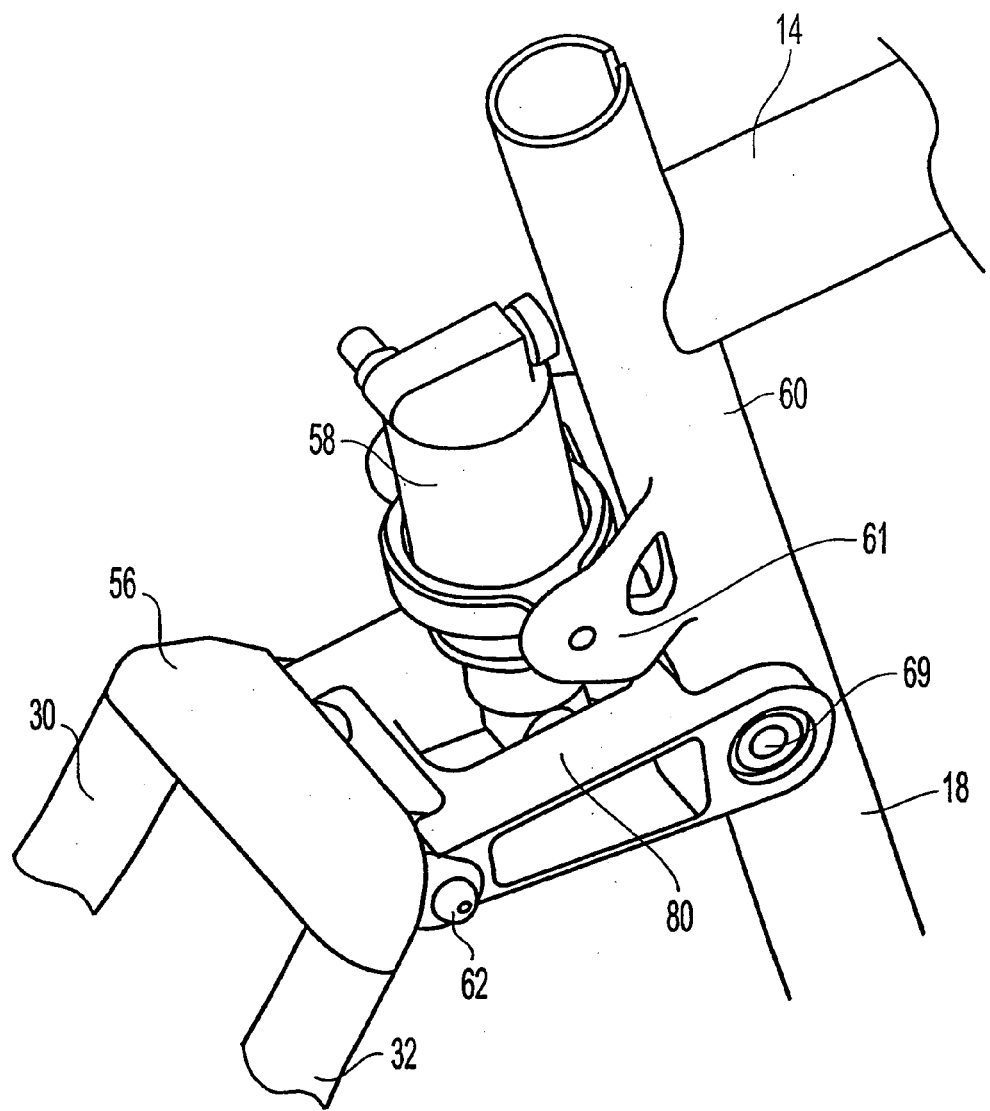
FIG. 12B is a close-up perspective view of the rear suspension assembly.

Referring to FIGS. 12–12B, the seat stay assembly 24 further includes a seat stay bridge member 56. The seat stay tubes 32 and 34 are joined together by the laterally extending seat stay bridge member 56. The seat stay bridge member 56 extends between first ends 32a and 34a of the tubes 32 and 34. The bridge member 36 is disposed at a location spaced upwardly from a tire intersect point P. In another embodiment, the seat stays are flexible like the chain stay tubes 38,40 discussed above.

Figure 16:
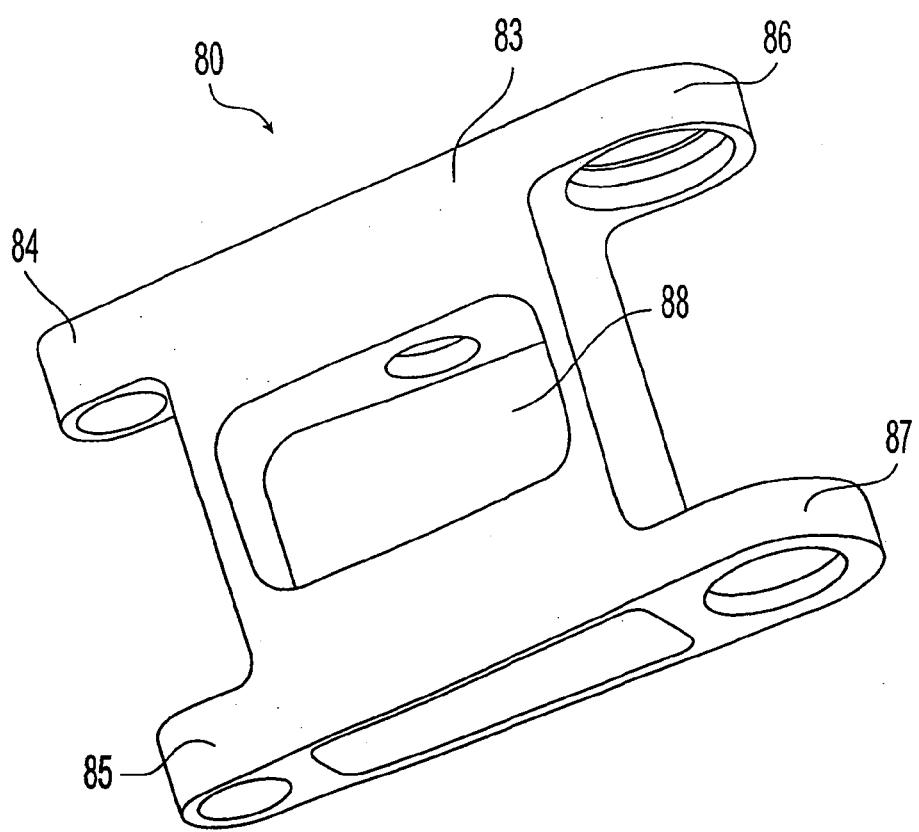
FIG. 16 is a top perspective view of the link in accordance with this invention.

As shown in FIGS. 1 and 12A–B, a rear suspension assembly 36 connects the bridge member 56 to the seat tube 18. The rear suspension assembly may be a spring or damper or needle bearing assembly. Preferably, the bridge member is connected to the seat tube 18 by at least one link 80. The link provides lateral stiffness to the frame 10. The preferred embodiment of the link is shown in FIG. 16. The link has a main body 83 with extending arms. First and second arms of the link are pivotally connected to the bridge seat stay member. Third and fourth arms 86 and 87 of the link are pivotally connected to the seat tube. A shock assembly 58 is received within the opening 88 of the main body of the link and secured to the link.

Additionally, the shock assembly 58 is supported adjacent an upper end 60 of the seat tube 18 via an upper clamp 61. The shock assembly 58 is any conventional rear suspension shock, preferably the shock assembly 58 is an air shock such as those currently sold on the market by Fox Racing Shox of San Jose, Calif.

Figure 12C:
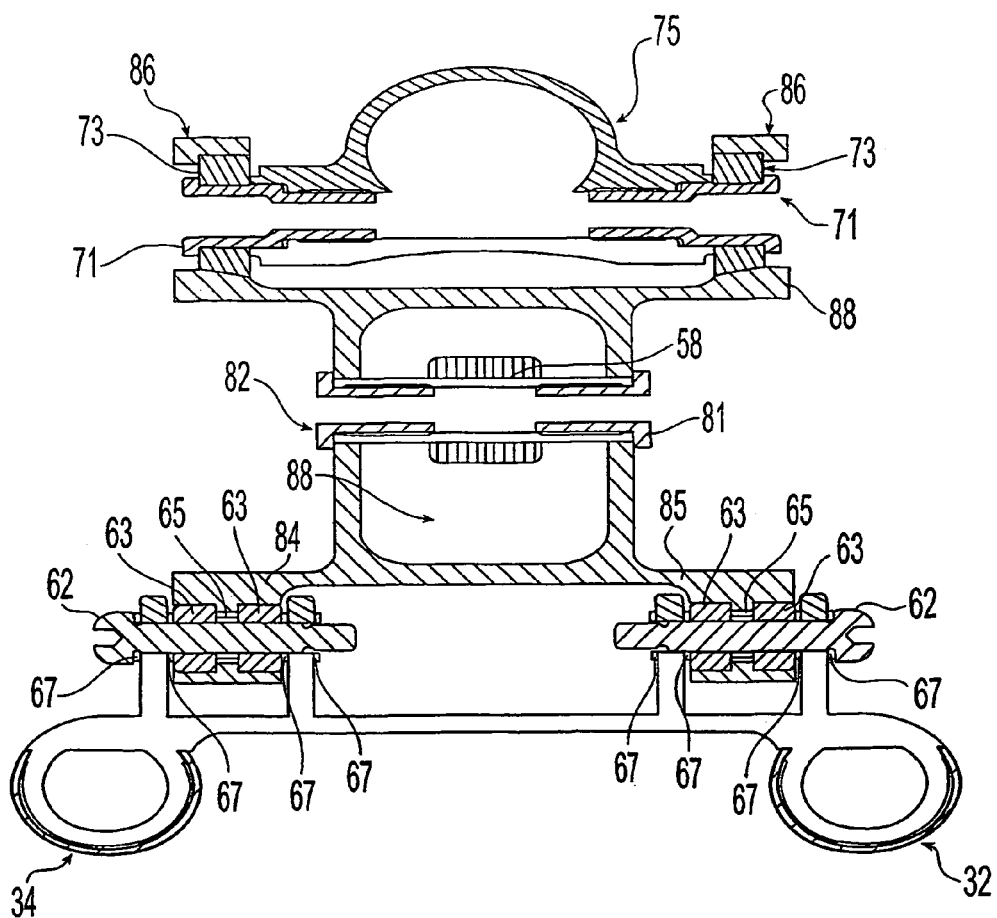
FIG. 12C is a cross-sectional view of the rear suspension assembly of FIGS. 2A and 2B taken at line 11C—11C.

As shown in FIG. 12C, the seat stay bridge member 36 is most preferably pivotally connected to the first and second arms of the link by screws 62 and bearings 63. Spacers 65 and washers 67 are also preferably used to complete the assembly. The third and fourth arms of the link are preferably pivotally connected to the seat tube 18 via a shock mount 75 with two bolt link mounts 71 and bearings 73. Two bolts 69 (shown in FIGS. 1–2B, and 12A–B) are used to connect the link to the seat tube 18 via the shock mount. An additional bolt shock mount 81 and nut shock mount 82 are used to secure the shock assembly 58 to the link 80 through the opening 88 via bolts 90 (shown in FIGS. 2A–B).

Figure 17B:
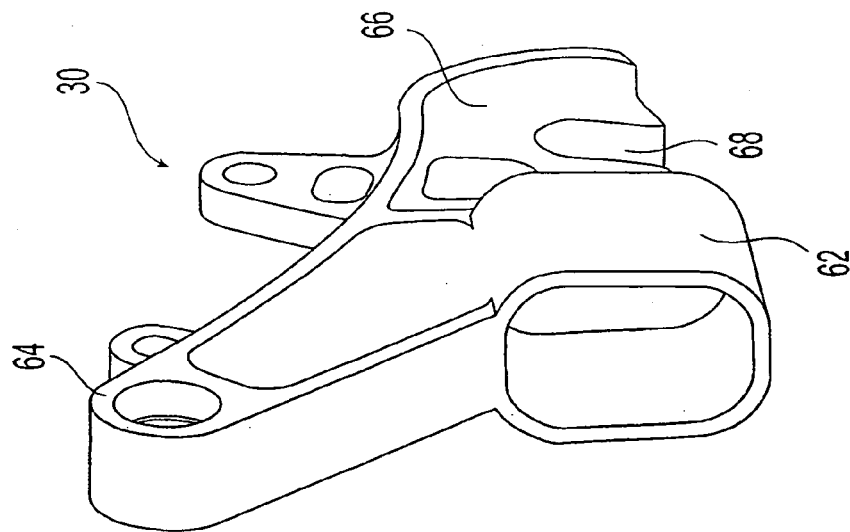
FIG. 17B is a perspective view of the left dropout of FIG. 17A.
Figure 17A:
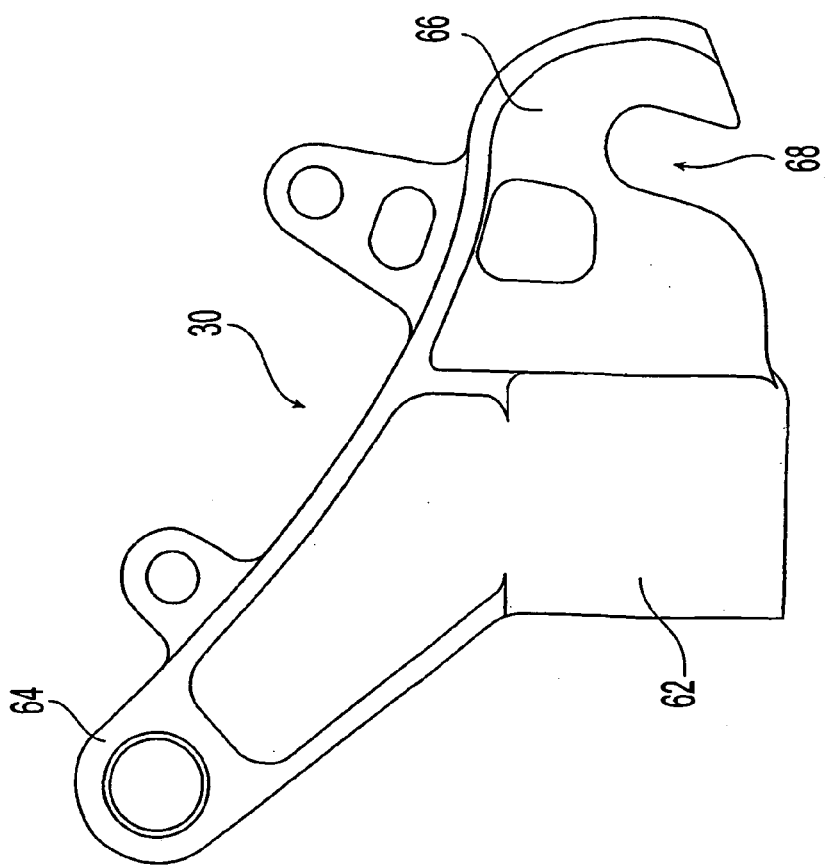
FIG. 17A is a side view of the left dropout in accordance with this invention.

Referring to FIGS. 17, 17A–B, and 18A–B, the dropouts are shown. As shown in FIGS. 17A–B, the left dropout features a lower first end 62 to receive the chain stay tube 38, 40, and an upper end 64 to receive the seat stay. A lower second end 66 forms a recess 68 that supports the rear wheel axle for rotatably supporting a rear wheel (not shown). The second end 48 of the chain stay tube 38,40 fits within the lower first end of the dropout in a basic tube and lug joint. Preferably, the chain stay tube 38,40 fits at least one inch within the lower first end of the dropout and is bonded in place with an adhesive. The seat stay is attached to the upper end of the dropout. Preferably, the seat stays are attached to the associated dropouts via a clevis 77 (shown in FIG. 1). FIGS. 18A–B show the right dropout. The right dropout features a second lower first end 74 to receive the chain stay tube 38,40, and a second upper end 70 to receive the seat stay. A second lower end 76 forms a second recess 78 that supports the rear wheel axle for supporting a wheel (not shown). The second end 48 of the chain stay tube 38,40 is preferably secured within the second lower first end of the right dropout in the same manner discussed above with regard to the left dropout.

Another embodiment of the dropout having a flexible neck (not shown) could be used with flexible seat stays made according to the teachings of the chain stay tubes 38,40 in accordance with the present invention. The left dropout is preferably mounted with a disc brake mount for receiving a disc brake.

Figure 20:
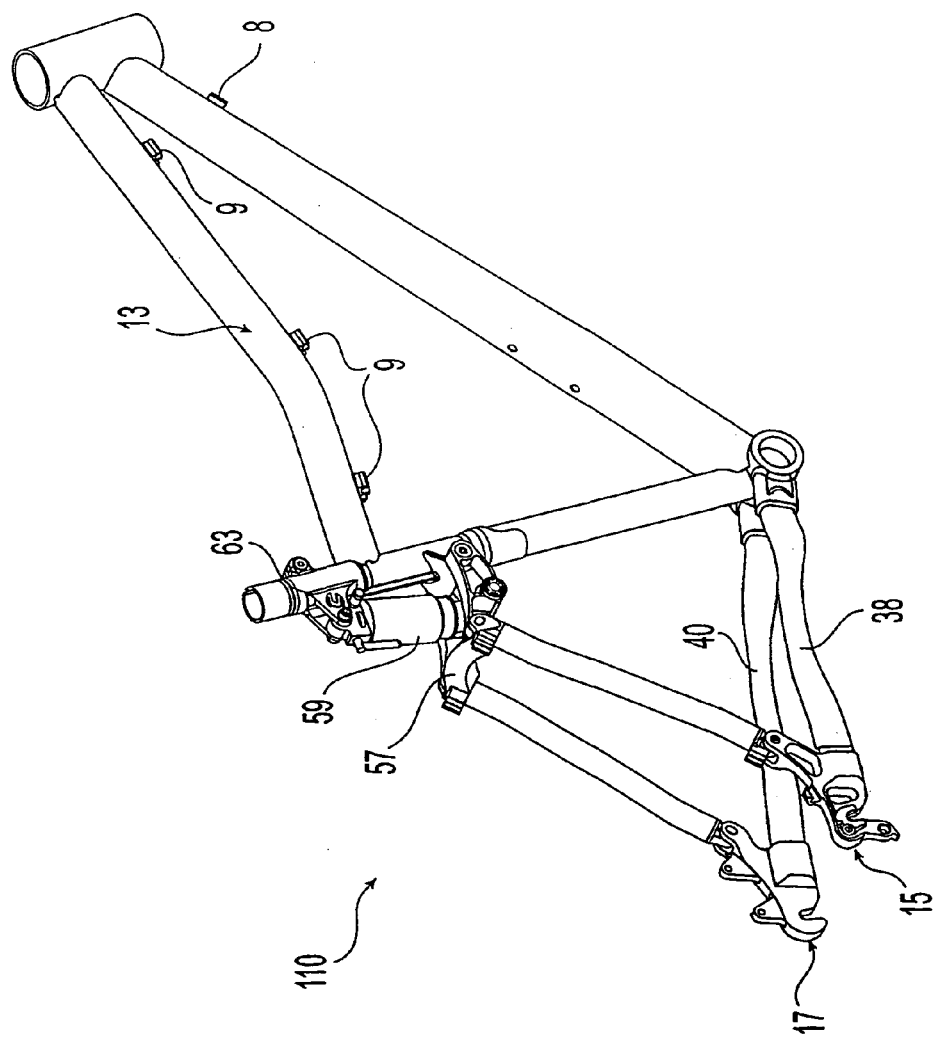
FIG. 20 is a rear, perspective view of another embodiment of a bicycle frame in accordance with this invention.

Referring to FIG. 20, another embodiment of the bicycle frame 10 in accordance with the present invention is shown with the chain stay tubes 38,40. The bicycle frame 110 is similar to the bicycle frame 10. However, the top tube 13 is bent along the length. Furthermore, the bridge member 57, the dropouts 15,17, the shock assembly 59 and upper clamp 63 are different from the bicycle frame 10. Moreover, the bicycle frame 110 includes a single cable stop 8 and a triple cable guide 9.

While it is apparent that illustrative embodiments of the invention have been disclosed and described, it will be appreciated that numerous modifications and other embodiments may be devised by those skilled in the art. One modification includes using the frame chain stay configuration and seat stay configuration of the first embodiment without the seat stay bridge member. Various other features of the embodiments can be combined. Furthermore, the frame can be modified so that the tubes are coupled in different ways than shown while providing the first and second portions of the frame. Therefore, it will be understood that the appended claims are intended to cover all such modifications and embodiments which come within the spirit and scope of the present invention.

What is claimed is:

1. A bicycle frame comprising:
   a pedal assembly having an axis of rotation;
   a chain stay extending from in the vicinity of said pedal assembly and flexing at a desired point along the length of said chain stay,
   wherein the chain stay is tubular and comprises a first portion, a second portion and a third portion, the third portion being disposed between the first portion and the second portion and being less resistant to flexing than the first portion and the second portion,
   and wherein the desired point is located in the third portion.

2. The bicycle frame of claim 1, wherein said desired point is in the vicinity of the pedal assembly.

3. The bicycle frame of claim 1, wherein said desired point is near said axis.

4. The bicycle frame of claim 1, wherein the portion of said chain stay at said desired point is flatter than another portion of said chain stay at at least one other point along the length of said chain stay.

5. The bicycle frame of claim 1, wherein said chain stay extends along one side of a wheel rotatably mounted on said bicycle frame, and further comprising a second chain stay that extends along a different side of said wheel.

6. The bicycle frame of claim 1, further comprising:
   a seat tube;
   at least one seat stay;
   a link being pivotally connected in the vicinity of said seat tube to pivot relative to said seat tube about a first axis, and being pivotally connected in the vicinity of said at least one seat stay to pivot relative to said at least one seat stay about a second axis;
   a shock assembly being pivotally connected in the vicinity of said link to pivot relative to said link at at least one connection point that is off a plane that contains said first axis and said second axis.

7. The bicycle frame of claim 1, further comprising a dropout and at least one seat stay, said at least one seat stay being connected in the vicinity of said dropout.

8. The bicycle frame of claim 7, wherein said at least one seat stay is pivotally connected in the vicinity of said dropout.

9. The bicycle frame of claim 7, wherein said at least one seat stay is pivotally connected to said dropout.

10. The bicycle frame of claim 6, further comprising a dropout, said at least one seat stay being connected in the vicinity of said dropout.

11. The bicycle frame of claim 10, wherein said at least one seat stay is pivotally connected in the vicinity of said dropout.

12. The bicycle frame of claim 10, wherein said at least one seat stay is pivotally connected to said dropout.

13. A bicycle frame comprising:
   a pedal assembly having an axis of rotation;
   a chain stay extending from in the vicinity of said pedal assembly;
   wherein at least one change in a cross-sectional shape of said chain stay in the vicinity of a desired point along the length of said chain stay allows said chain stay to flex at said desired point, the cross-sectional shape being in a plane perpendicular to the length of said chain stay,
   wherein the chain stay is tubular and comprises a first portion, a second portion and a third portion, the third portion being disposed between the first portion and the second portion and being less resistant to flexing than the first portion and the second portion, wherein the first portion and the second portion have cross-sectional shapes that are substantially the same.
   and wherein the desired point is located in the third portion.

14. The bicycle frame of claim 13, wherein said desired point is in the vicinity of the pedal assembly.

15. The bicycle frame of claim 13, wherein said desired point is near said axis.

16. The bicycle frame of claim 13, wherein the portion of said chain stay at said desired point is flatter than another portion of said chain stay at at least one other point along the length of said chain stay.

17. The bicycle frame of claim 13, wherein said chain stay extends along one side of a wheel rotatably mounted on said bicycle frame, and further comprising a second chain stay that extends along a different side of said wheel.

18. The bicycle frame of claim 13, further comprising:
   a seat tube;
   at least one seat stay;
   a link being pivotally connected in the vicinity of said seat tube to pivot relative to said seat tube about a first axis, and being pivotally connected in the vicinity of said at least one seat stay to pivot relative to said at least one seat stay about a second axis;
   a shock assembly being pivotally connected in the vicinity of said link to pivot relative to said link at at least one connection point that is off a plane that contains said first axis and said second axis.

19. The bicycle frame of claim 13, further comprising a dropout and at least one seat stay, said at least one seat stay being connected in the vicinity of said dropout.

20. The bicycle frame of claim 19, wherein said at least one seat stay is pivotally connected in the vicinity of said dropout.

21. The bicycle frame of claim 19, wherein said at least one seat stay is pivotally connected to said dropout.

22. The bicycle frame of claim 18, further comprising a dropout, said at least one seat stay being connected in the vicinity of said dropout.

23. The bicycle frame of claim 22, wherein said at least one seat stay is pivotally connected in the vicinity of said dropout.

24. The bicycle frame of claim 22, wherein said at least one seat stay is pivotally connected to said dropout.

25. The bicycle frame of claim 13, wherein at least one change in the dimensions of said chain stay in the vicinity of said desired point also allows said chain stay to flex at said desired point.

26. A bicycle frame comprising:
a pedal assembly having an axis of rotation;
a chain stay extending from in the vicinity of said pedal assembly; wherein at least one change in the dimensions of said chain stay in the vicinity of a desired point along the length of said chain stay allows said chain stay to flex at said desired point,
wherein the chain stay is tubular and comprises a first portion, a second portion and a third portion, the third portion being disposed between the first portion and the second portion and being less resistant to flexing than the first portion and the second portion,
and wherein the desired point is located in the third portion.

27. The bicycle frame of claim 26, wherein said desired point is in the vicinity of the pedal assembly.

28. The bicycle frame of claim 26, wherein said desired point is near said axis.

29. The bicycle frame of claim 26, wherein the portion of said chain stay at said desired point is flatter than another portion of said chain stay at at least one other point along the length of said chain stay.

30. The bicycle frame of claim 26, wherein said chain stay extends along one side of a wheel rotatably mounted on said bicycle frame, and further comprising a second chain stay that extends along a different side of said wheel.

31. The bicycle frame of claim 26, further comprising:

a seat tube;

at least one seat stay;

a link being pivotally connected in the vicinity of said seat tube to pivot relative to said seat tube about a first axis, and being pivotally connected in the vicinity of said at least one seat stay to pivot relative to said at least one seat stay about a second axis;

a shock assembly being pivotally connected in the vicinity of said link to pivot relative to said link at at least one connection point that is off a plane that contains said first axis and said second axis.

32. The bicycle frame of claim 26, further comprising a dropout and at least one seat stay, said at least one seat stay being connected in the vicinity of said dropout.

33. The bicycle frame of claim 32, wherein said at least one seat stay is pivotally connected in the vicinity of said dropout.

34. The bicycle frame of claim 32, wherein said at least one seat stay is pivotally connected to said dropout.

35. The bicycle frame of claim 31, further comprising a dropout, said at least one seat stay being connected in the vicinity of said dropout.

36. The bicycle frame of claim 35, wherein said at least one seat stay is pivotally connected in the vicinity of said dropout.

37. The bicycle frame of claim 35, wherein said at least one seat stay is pivotally connected to said dropout.

38. The bicycle frame of claim 26, wherein at least one change in the shape of said chain stay in the vicinity of said desired point also allows said chain stay to flex at said desired point.

* * * * *